US010868946B2

(12) United States Patent
Lee et al.

(10) Patent No.: US 10,868,946 B2
(45) Date of Patent: Dec. 15, 2020

(54) ACTUATOR OF CAMERA MODULE

(71) Applicant: SAMSUNG ELECTRO-MECHANICS CO., LTD., Suwon-si (KR)

(72) Inventors: Jong Woo Lee, Suwon-si (KR); Joo Hyoung Lee, Suwon-si (KR); Je Hyuk Ryu, Suwon-si (KR); Woo Young Choi, Suwon-si (KR); Yong Woon Ji, Suwon-si (KR); Soo Woong Lee, Suwon-si (KR); Byung Joo Hong, Suwon-si (KR); Joo Yul Ko, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 621 days.

(21) Appl. No.: 15/651,189

(22) Filed: Jul. 17, 2017

(65) Prior Publication Data

US 2018/0152608 A1  May 31, 2018

(30) Foreign Application Priority Data

Nov. 28, 2016  (KR) .................. 10-2016-0159452

(51) Int. Cl.
*G02B 7/02* (2006.01)
*H04N 5/225* (2006.01)
(Continued)

(52) U.S. Cl.
CPC ........... *H04N 5/2257* (2013.01); *G02B 7/028* (2013.01); *G02B 7/08* (2013.01); *G02B 7/09* (2013.01);
(Continued)

(58) Field of Classification Search
CPC .... G03B 2205/0007; G03B 2205/0069; G03B 5/00; H04N 5/2254; H04N 5/23258;
(Continued)

(56) References Cited

U.S. PATENT DOCUMENTS

2011/0156763 A1* 6/2011 Gao .................... G02B 7/08
327/108
2014/0066122 A1* 3/2014 Shukla ............... H02K 41/0356
455/556.1

FOREIGN PATENT DOCUMENTS

CN   102116922 A    7/2011
JP   2009-271204 A  11/2009
(Continued)

OTHER PUBLICATIONS

Korean Office Action dated May 21, 2019 in counterpart Korean Patent Application No. 10-2016-0159452 (8 pages in English and 6 pages in Korean).
(Continued)

*Primary Examiner* — Alicia M Harrington
(74) *Attorney, Agent, or Firm* — NSIP Law

(57) ABSTRACT

An actuator includes a magnet, a driving coil, a driver, and a position detector. The magnet is disposed on one surface of a lens barrel. The driving coil is disposed at a proximity of the magnet. The driver is configured to apply a driving signal to the driving coil to move the lens barrel along an optical axis. The position detector is configured to generate an oscillation signal of which a frequency is changed based on movement of the magnet and configured to compare oscillation signals generated in a first position and a second position of the lens barrel to detect a present position of the lens barrel.

20 Claims, 4 Drawing Sheets

(51) Int. Cl.
    *G02B 27/64*     (2006.01)
    *G02B 7/08*     (2006.01)
    *G02B 7/09*     (2006.01)
    *H04N 5/232*     (2006.01)

(52) U.S. Cl.
    CPC ........... *G02B 27/64* (2013.01); *G02B 27/646* (2013.01); *H04N 5/2253* (2013.01); *H04N 5/232* (2013.01); *H04N 5/23212* (2013.01); *H04N 5/23258* (2013.01); *H04N 5/23287* (2013.01)

(58) Field of Classification Search
    CPC .. H04N 5/23287; H04N 5/2257; G03F 7/709; G03F 7/70825; F16F 15/03; G02B 7/005; G02B 7/023; G02B 7/004; G02B 7/026; G02B 7/102; G02B 7/08; H02K 41/0356; G11B 7/0932; G11B 7/0935
    See application file for complete search history.

(56) References Cited

FOREIGN PATENT DOCUMENTS

| | | |
|---|---|---|
| JP | 2014-191092 A | 10/2014 |
| KR | 10-0392309 B1 | 7/2003 |
| KR | 10-1166418 B1 | 7/2012 |
| KR | 10-2013-0077216 A | 7/2013 |
| KR | 10-2014-0022986 A | 2/2014 |

OTHER PUBLICATIONS

Chinese Office Action dated Jan. 19, 2020 in counterpart Chinese Patent Application No. 201710821460.4 (12 pages in English and 9 pages in Chinese).

* cited by examiner

ACTUATOR OF CAMERA MODULE

CROSS-REFERENCE TO RELATED APPLICATION(S)

This application claims benefit under 35 USC 119(a) of priority to Korean Patent Application No. 10-2016-0159452 filed on Nov. 28, 2016 in the Korean Intellectual Property Office, the disclosure of which is incorporated herein by reference in its entirety.

BACKGROUND

1. Field

The following description relates to an actuator of a camera module.

2. Description of Related Art

A portable communications terminal, such as a cellular phone, a personal digital assistant (PDA), a portable personal computer (PC), or the like, is normally used to transmit video data and text or audio data. In accordance with such a trend, a camera module has recently been standardly installed in such a portable communications terminal in order to enable the transmission of video data, to enable video chatting, and other transmission of visual data.

Generally, a camera module includes a lens barrel having lenses disposed therein, a housing accommodating the lens barrel therein, and an image sensor converting an image of a subject into an electrical signal. A single focus type camera module imaging a subject with fixed focus may be used as the camera module. However, in view of recent developments in camera technology, a camera module including an actuator enabling auto-focusing has been used. In addition, such a camera module normally includes an actuator for optical image stabilization (OIS) in order to suppress a resolution decrease phenomenon due to hand-shake.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an actuator of a camera module is described that precisely detects a position of a magnet without using a hall sensor.

In accordance with an embodiment, there is provided an actuator, including: a magnet disposed on one surface of a lens barrel; a driving coil disposed at a proximity of the magnet; a driver configured to apply a driving signal to the driving coil to move the lens barrel along an optical axis; and a position detector configured to generate an oscillation signal of which a frequency may be changed based on movement of the magnet and configured to compare oscillation signals generated in a first position and a second position of the lens barrel and an oscillation signal generated in a present position of the lens barrel to detect the present position of the lens barrel.

The position detector may detect the present position of the lens barrel based on a count value calculated by counting the oscillation signals using reference clocks.

The position detector may generate position information based on count values in the first position and the second position of the lens barrel.

The position information may be provided in a linear function form based on the first position, a count value in the first position, the second position, and a count value in the second position.

The position detector may detect the present position of the lens barrel by applying a count value in the present position to the position information.

The first position may correspond to an infinity position of the lens barrel, and the second position corresponds to a proximate position of the lens barrel.

The position detector may include an inductor configured to generate the oscillation signal and determine the frequency of the oscillation signal.

The inductor may be disposed in a range of a magnetic field of the magnet.

A magnetic body may be disposed between the oscillation circuit and the magnet.

In accordance with an embodiment, there is provided an actuator, including: a magnet disposed on a surface of a lens barrel; a driving coil disposed at a proximity of the magnet; a driver configured to apply a driving signal to the driving coil to move the lens barrel in one direction; and a position detector configured to generate a digital signal of which a level may be changed based on the movement of the lens barrel to detect a present position of the lens barrel, wherein the position detector corrects at least one of a digital signal at a first position and a digital signal at a second position of the lens barrel to generate position information and detect the present position of the lens barrel.

The position detector may correct digital levels of the digital signals in the first position and the second position to correspond to a maximum value and a minimum value, respectively, of a reference digital level section.

The position detector may correct digital levels of the digital signals in the first position and the second position based on a change in an external environment.

The change in the external environment may also include a change in temperature.

The position detector may determine a correction level of the digital levels of the digital signals in the first position and the second position based on a change ratio in the temperature.

The position detector may determine an increase or decrease direction of correction of the digital levels of the digital signals in the first position and the second position based on a change direction of the temperature.

The first position may correspond to an infinity position of the lens barrel, and the second position corresponds to a proximate position of the lens barrel.

The position detector may also include an oscillator configured to generate the digital signal at the first position of the lens barrel corresponding to a long distance imaging position and configured to generate the digital signal at the second position of the lens barrel corresponding to a close-up imaging position.

The position detector may also include a corrector configured to increase a digital level of the digital signal in the first position of the lens barrel and a digital level of the digital signal in the second position of the lens barrel in response to the temperature rising.

The position detector may also include a corrector configured to decrease a digital level of the digital signal in the first position and a digital level of the digital signal in the second position in response to the temperature dropping.

The driving coil may be disposed on a surface of a substrate, which further may also include the driver and the position detector, and facing the magnet.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Figure 1:
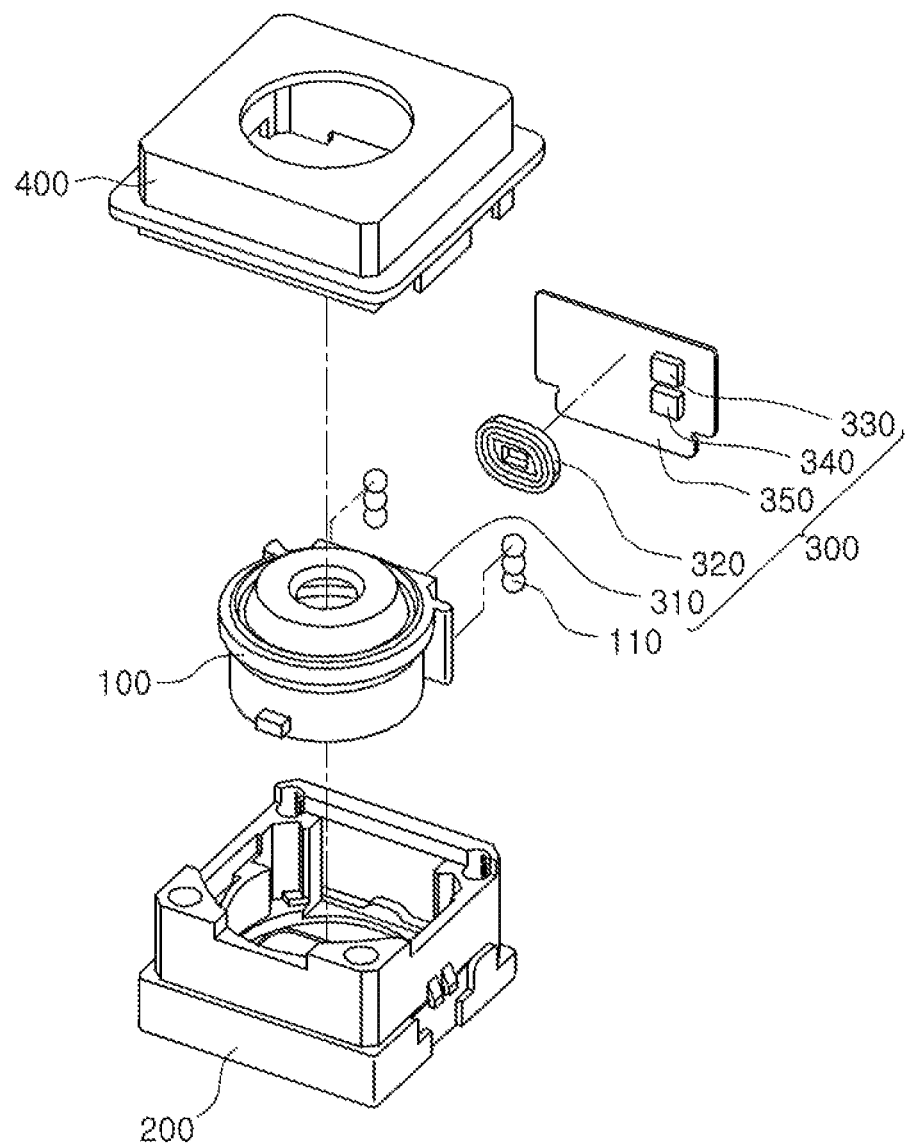
FIG. 1 is an exploded perspective view illustrating a camera module, according to an embodiment.

FIG. 1 is an exploded perspective view illustrating a camera module, according to an embodiment.

Referring to FIG. 1, the camera module, according to the embodiment, includes a lens barrel 100, a housing 200, an actuator 300, and a case 400.

The lens barrel 100 has a hollow cylindrical shape so that at least one lens imaging a subject is accommodated therein. The lens is included in the lens barrel 100, and is symmetrical along an optical axis. In an example, an optical axis direction refers to a vertical direction in relation to the lens barrel 100 or a straight line passing through the geometrical center of a lens and joining the two centers of curvature of its surfaces. Sometimes the optical axis of a lens is called its principal axis. The number of lenses stacked in the lens barrel 100 may depend on target specification for the camera module. The lenses may have defined optical characteristics such as the same refractive index or different refractive indices, surface curvatures, or refractive powers. The lens barrel 100 is disposed in the housing 200 and is coupled to the housing 200. The lens barrel 100 moves in one direction, more specifically, along the optical axis direction, within the housing 200 for the purpose of auto-focusing.

The housing 200 accommodates the lens barrel 100 therein so that the lens barrel 100 moves in the optical axis direction. Therefore, the housing 200 may have an internal space formed therein to accommodate the lens barrel 100 therein. At least one ball bearing 110 is provided in the optical axis direction within the lens barrel 100, as a guide device configured to guide a movement of the lens barrel 100 when the lens barrel 100 moves in the optical axis direction within the housing 200.

At least one ball bearing 110 is disposed between the lens barrel 100 and the housing 200 to guide the movement of the lens barrel 100 in the optical axis direction through a rolling motion. At least one ball bearing 110 may be in contact with an outer surface of the lens barrel 100 and an inner surface of the housing 200 in order to guide the movement of the lens barrel 100 in the optical axis direction. When the lens barrel 100 moves in the optical axis direction within the housing 200, at least one ball bearing 110 supports the lens barrel 100, and the lens barrel 100 thus moves in parallel with the optical axis.

The case 400 is coupled to the housing 200 to form an exterior of the camera module. The case 400 is coupled to the housing 200 to surround an outer surface of the housing 200. The case 400 blocks electromagnetic waves generated while the camera module is driven. That is, the electromagnetic waves are generated when the camera module is driven. In a scenario in which electromagnetic waves are emitted externally of the camera module, the electromagnetic waves would affect other electronic components causing communications errors or malfunctions in the other electronic components. In order to prevent such a problem, the case 400 is formed of a metal and is grounded to a ground pad of a substrate mounted on a lower surface of the housing 200 to block the electromagnetic waves. Further, when the case 400 is formed of a plastic injection-molded product, a conductive paint is applied to an inner surface of the case 400 or a conductive film or a conductive tape is attached to the inner surface of the case 400 to block the electromagnetic waves. In this case, the conductive paint may be conductive epoxy, but is not limited thereto. That is, various materials having conductivity may be used as the conductive paint.

Although not illustrated in FIG. 1, a stopper may additionally be disposed between the case 400 and the lens barrel 100 to limit a movement distance of the lens barrel 100. As an example, the stopper would be disposed below the case 400. The stopper would be spaced apart from the lens barrel 100 in the optical axis direction when power is not applied to a driving coil 320. In one configuration, the stopper would have a flat shape with an opening to receive the lens barrel 100. In a configuration, the stopper is a single structural element and, in another configuration, the stopper is formed of multiple flat structural elements to form a whole structural element. Therefore, when the lens barrel 100 moves in the optical axis direction by the power applied to the driving coil 320, the stopper limits the movement distance of the lens barrel 100, such that the lens barrel 100 moves in a range of an interval with the stopper. The stopper may be formed of a material having elasticity in order to alleviate impact generated when the stopper and the lens barrel 100 collide with each other.

The actuator 300 drives the lens barrel 100 in the optical axis direction. The actuator 300 includes a magnet 310, the driving coil 320, a driver 330, and a position detector 340, and further includes a substrate 350.

The magnet 310 is disposed on one side surface of the lens barrel 100, and the driving coil 320 is disposed on one surface of the substrate 350 mounted in the housing 200 and facing the magnet 310. Although not illustrated in FIG. 1, the actuator 300 may also include a yoke mounted on another surface of the substrate 350 to prevent leakage of a magnetic flux generated between the magnet 310 and the driving coil 320, and the magnet 310 may include two magnetic bodies polarized from each other in order to easily move the lens barrel 100.

The driver 330 applies a driving signal to the driving coil 320 to produce a driving force with the magnet 310. The driver 330 may include a driver integrated circuit (IC) providing the driving signal to the driving coil 320. For example, when the driving signal is produced by the driver 330 to the driving coil 320, a magnetic flux is generated in the driving coil 320, and interacts with a magnetic field of the magnet 310 to generate the driving force moving the lens barrel 100 in the optical axis direction depending on Fleming's left hand rule. The driver 330 may include an H-bridge circuit, which may be bidirectionally driven to apply the driving signal to the driving coil 320 in a voice coil motor scheme.

The position detector 340 detects a position of the magnet 310 provided on the lens barrel 100 moving by the driving of the driver 330, more specifically, on one side surface of the lens barrel 100. The position detector 340 provides the detected position of the magnet 310 as a feedback signal to the driver 330. In response, the driver 330 minutely adjusts the position of the magnet 310 using the feedback signal from the position detector 340. The position detector 340, according to an embodiment, generates an oscillation signal of which a frequency is changed depending on movement of the magnet 310, and detects the position of the magnet 310 based on the frequency of the oscillation signal.

The driver 330 and the position detector 340 are mounted on the substrate 350 to face the magnet 310, and the substrate 350 is fixed to the housing 200. A case in which the driver 330 and the position detector 340 are disposed outside the driving coil 320 is illustrated in FIG. 1, but the driver 330 and the position detector 340 may also be disposed in a hollow part provided inside or in a middle portion of the driving coil 320. In addition, an example in which the driver 330 and the position detector 340 are mounted on one substrate 350 is illustrated in FIG. 1, but the driver 330 and the position detector 340 may be separately formed on two different substrates, and the two different substrates may be disposed on opposite surfaces of the lens barrel 100, respectively.

Figure 2:
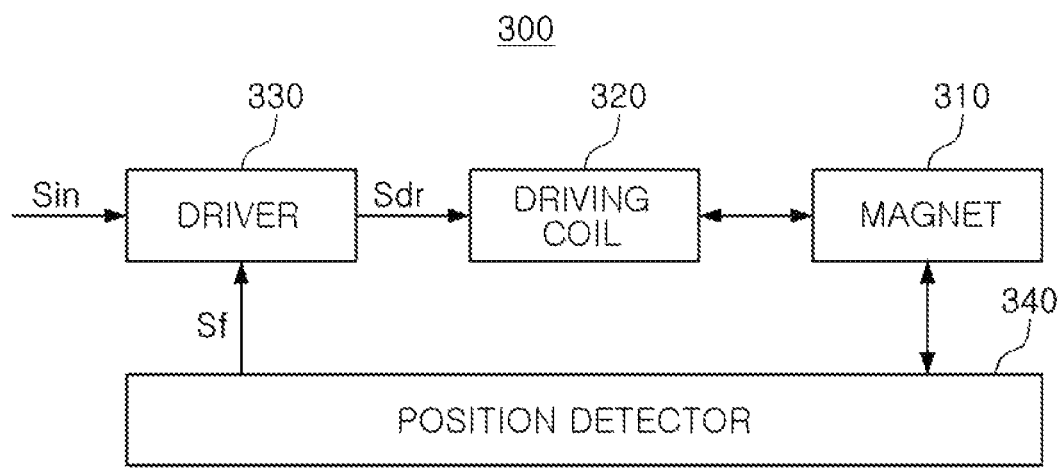
FIG. 2 is a block diagram illustrating an actuator used in a camera module, according to an embodiment.

FIG. 2 is a block diagram illustrating an actuator used in a camera module, according to an embodiment. Hereinafter, a driving scheme of the actuator, according to an embodiment, will be described in detail with reference to FIGS. 1 and 2.

The driver 330 generates a driving signal Sdr based on an input signal Sin input from an external source and a feedback signal Sf generated from the position detector 340, and provides the generated driving signal Sdr to the driving coil 320. When the driving signal Sdr is applied from the driver 330 to the driving coil 320, the lens barrel 100 moves in the optical axis direction from an electromagnetic interaction between the driving coil 320 and the magnet 310.

The position detector 340 detects a change in the position of the magnet 310 from the electromagnetic interaction between the magnet 310 and the driving coil 320 and generates the feedback signal Sf. The position detector 340 provides the feedback signal Sf to the driver 330. The position detector 340 includes at least one inductor, and detects the position of the magnet 310 based on a change in inductance of the inductor. The inductance changes based on or as a function of the movement of the magnet 310.

Figure 3:
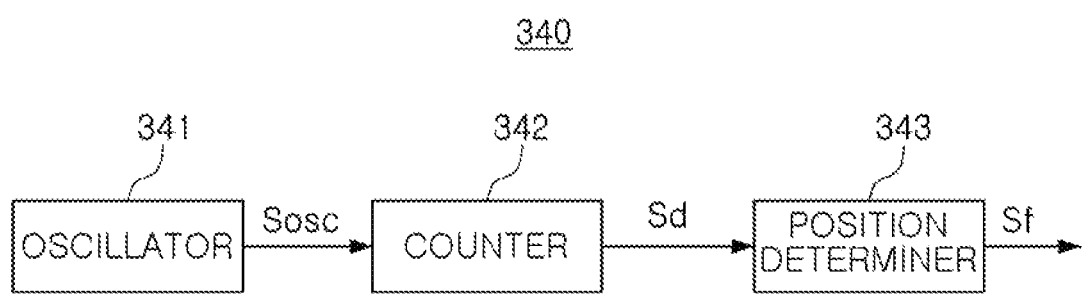
FIG. 3 is a block diagram illustrating a position detector, according to an embodiment.

FIG. 3 is a block diagram illustrating a position detector, according to an embodiment. An operation of detecting the position of the magnet 310 by the position detector 340 will hereinafter be described with reference to FIGS. 1 through 3.

The position detector 340, according to an embodiment, includes an oscillator 341, a counter 342, and a position determiner 343.

The oscillator 341 includes an oscillation circuit to generate an oscillation signal Sosc. The oscillator 341 generates an oscillation signal Sosc at a present or a current position of the lens barrel 100. In addition, the oscillator 341 generates an oscillation signal Sosc indicative of an infinity position Position_infinity of the lens barrel 100 corresponding to a long distance imaging position, or a furthest distance that a lens in the lens barrel 100, closest to a subject from which an image is being captured, would travel towards the subject. The oscillator 341 also generates another oscillation signal Sosc indicative of a proximate position Position_macro of the lens barrel 100 corresponding to a close-up imaging position.

In order to generate the oscillation signals Sosc in the infinity position Position_infinity and the proximate position Position_macro, the lens barrel 100 moves or travels once between the infinity position Position_infinity and the proximate position Position_macro, before a present position of the lens barrel 100 is detected.

The oscillation circuit includes at least one inductor, and may further include at least one capacitor and/or at least one resistor. As an example, the oscillation circuit may include an LC oscillator including at least one inductor and at least one capacitor, and may be configured in a form such as the well-known Colpitts oscillator.

A frequency of the oscillation signal Sosc of the oscillation circuit is determined by an inductance of at least one inductor. When the oscillation circuit is implemented by the LC oscillator including the inductor and the capacitor, the frequency f of the oscillation signal Sosc is represented by Equation 1. In Equation 1, indicates an inductance of the inductor, and c indicates a capacitance of the capacitor.

$$f = \frac{1}{2\pi\sqrt{lc}}$$ [Equation 1]

The oscillator 341 of the position detector 340 is disposed in a range of a magnetic field of the magnet 310. Therefore, at least one inductor provided in the oscillation circuit of the oscillator 341 is disposed in the range of the magnetic field of the magnet 310, and an inductance of at least one inductor is affected by the magnetic field of the magnet 310.

When the magnet 310 moves by the driving force from the driver 330, strength of the magnetic field of the magnet 310 affecting the inductance of at least one inductor of the oscillation circuit changes, and the inductance of the inductor is, thus, changed. Therefore, the frequency of the oscillation signal Sosc output from the oscillator 341 changes depending on the movement of the magnet 310.

According to an embodiment, a magnetic body having a high magnetic permeability and a paint formed of a magnetic material are formed between the magnet 310 and the oscillator 341 in order to raise a change ratio of the inductance of the inductor of the oscillator 341 depending on the movement of the position of the magnet 310.

An example in which the oscillator 341 includes one oscillation circuit is described above, but the oscillator 341 may include a plurality of oscillation circuits, and each of the plurality of oscillation circuits may generate an oscillation signal Sosc. When the oscillator 341 includes the oscillation circuits, an inductor provided in each of the oscillation circuits would be mounted on the substrate 350 in the optical axis direction. When the lens barrel 100 moves in the optical axis direction, frequencies of the oscillation signals Sosc generated in the oscillation circuits may be different from each other due to the inductors disposed in the optical axis direction.

Hereinafter, a case in which the oscillator 341 includes one oscillation circuit will be described for convenience of explanation. However, characteristics of the oscillator 341 including a plurality of oscillation circuits will be described in detail, if necessary.

The counter 342 generates a digital signal Sd from the oscillation signal Sosc output from the oscillator 341. The counter 342 generates a digital signal in a present position of the lens barrel 100. In addition, the counter 342 generates a digital signal in the infinity position Position_infinity of the lens barrel 100 and a digital signal in the proximate position Position_macro of the lens barrel 100.

The counter 342 counts the oscillation signals Sosc at the respective positions and output from the oscillator 341 to generate the digital signals. Digital levels of the digital signals are determined based on a count value. In an example, a level of the digital signal in the present position of the lens barrel 100 is determined based on a count value of the oscillation signal Sosc in the present position of the lens barrel 100. A level of the digital signal in the infinity position Position_infinity of the lens barrel 100 is determined based on a count value of the oscillation signals Sosc in the infinity position Position_infinity of the lens barrel 100. A level of the digital signal in the proximate position Position_macro of the lens barrel 100 is determined depending on a count value of the oscillation signals Sosc in the proximate position Position_macro of the lens barrel 100.

The counter 342 counts the oscillation signals Sosc using reference clocks CLK. In an example, the counter 342 counts the oscillation signals Sosc during a reference time using reference clocks CLK, and generates a count value based on a number of counted reference clocks CLK.

The position determiner 343 determines the present position of the lens barrel 100 from the digital level of the digital signal Sd transferred from the counter 342.

The position determiner 343 receives the digital level in the present position of the lens barrel 100, the digital level in the infinity position Position_infinity of the lens barrel 100, and the digital level in the proximate position Position_macro of the lens barrel 100 transferred from the counter 342.

The position determiner 343 calculates position information of the lens barrel using the digital level in the infinity position Position_infinity and the digital level in the proximate position Position_macro, and applies the digital level in the present position to the position information to determine the present position of the lens barrel 100. The position determiner 343 provides the present position of the lens barrel 100 as a feedback signal Sf.

Figure 4:
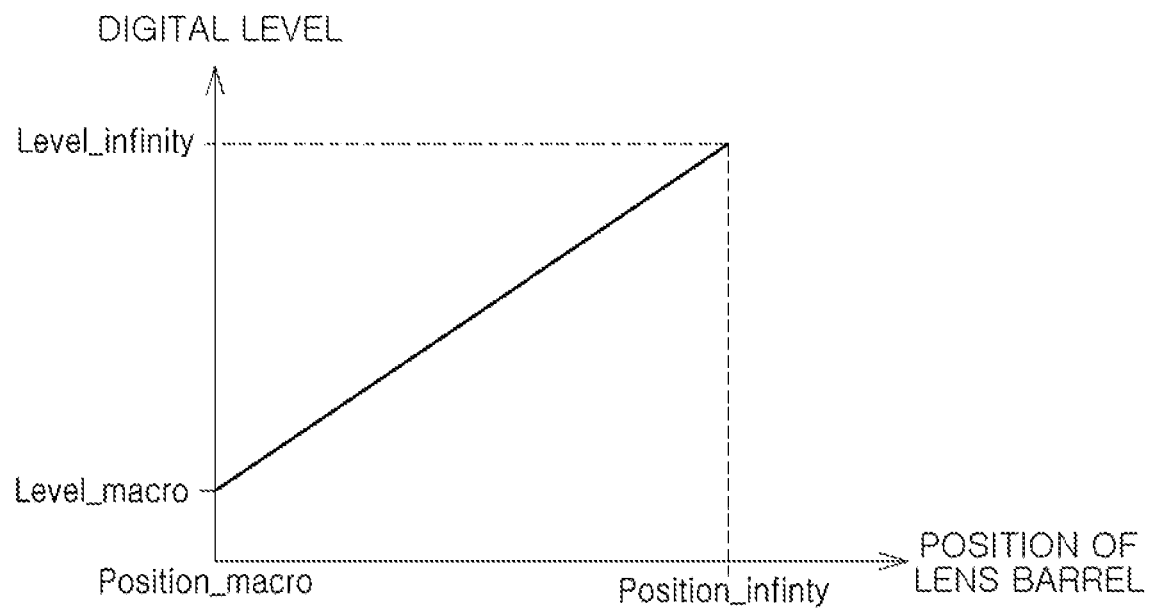
FIG. 4 is a graph illustrating position information of a lens barrel, according to an embodiment.

FIG. 4 is a graph illustrating position information of a lens barrel, according to an embodiment.

The position determiner 343 calculates the position information of the lens barrel using the infinity position Position_infinity, the digital level Level_infinity in the infinity position Position_infinity, the proximate position Position_macro, and the digital level Level_macro in the proximate position Position_macro. As an example, the position information of the lens barrel is calculated in a linear function form.

In detail, the position determiner 343 calculates position information illustrated in FIG. 4 according to Equation 2. In Equation 2, the infinity position Position_infinity, the digital level Level_infinity in the infinity position Position_infinity, the proximate position Position_macro, and the digital level Level_macro in the proximate position Position_macro are measured. Therefore, when a digital level Level_present in the present position is applied to the position information, a present position Position_present of the lens barrel 100 is determined.

$$\text{Level\_present} = \frac{(\text{Level\_infinity} - \text{Level\_macro})}{(\text{Position\_infinity} - \text{Position\_macro})} + \text{Position\_present} + \text{Level\_macro}$$ [Equation 2]

The position determiner 343 includes a memory to store the position information therein. The memory may be implemented by a non-volatile memory including one of a flash memory, an electrically erasable programmable read-only memory (EEPROM), and a ferroelectric random access memory (FeRAM).

Figure 5:
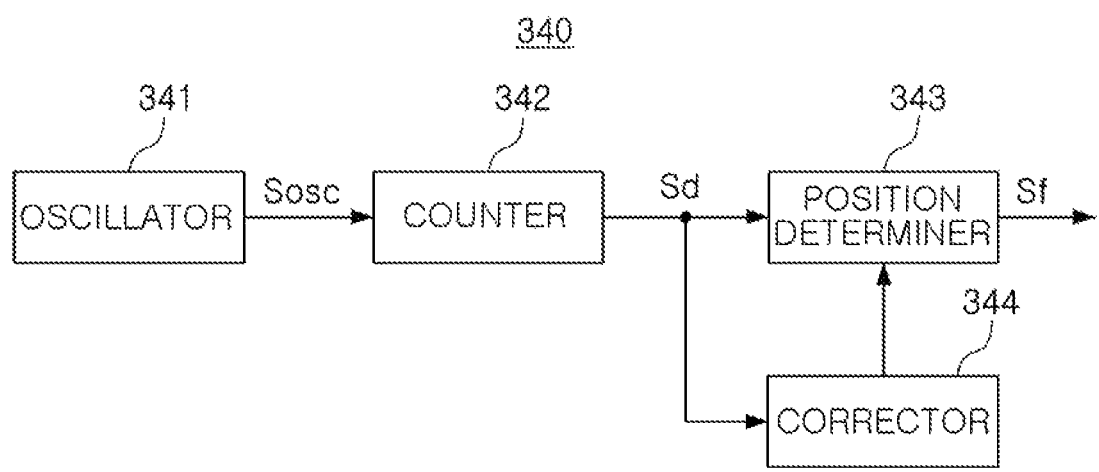
FIG. 5 is a block diagram illustrating a position detector, according to another embodiment.

FIG. 5 is a block diagram illustrating a position detector, according to another embodiment. An operation of detecting the position of the magnet 310 by the position detector 340, according to another embodiment, will hereinafter be described with reference to FIGS. 1 through 5.

Because the position detector 340, according to another embodiment, as illustrated in FIG. 5 is similar to the position detector 340, according to the embodiment illustrated in FIG. 3, descriptions of contents the same as or overlapping with each other will be omitted, and contents different from those previously disclosed will mainly be described.

The position detector 340, according to another embodiment, further includes a corrector 344.

The corrector 344 corrects the digital level of the digital signal transferred from the counter 342, and provides the corrected digital level to the position determiner 343. The corrector 344 receives the digital level in the infinity position Position_infinity of the lens barrel 100 and the digital level in the proximate position Position_macro of the lens barrel 100 transferred from the counter 342, and corrects at least one of the digital level in the infinity position Position_infinity and the digital level in the proximate position Position_macro and provides the corrected digital level to the position determiner 343.

According to another embodiment, the corrector 344 compares the digital level in the infinity position Position_infinity of the lens barrel 100 and the digital level in the proximate position Position_macro of the lens barrel 100 with a reference digital level section to correct the digital level in the infinity position Position_infinity of the lens barrel 100 and/or the digital level in the proximate position Position_macro of the lens barrel 100. The corrector 344 determines that the digital levels have excessively changed due to an external factor to perform level correction, when the digital level in the infinity position Position_infinity of the lens barrel 100 and the digital level in the proximate position Position_macro of the lens barrel 100 are outside or exceed the reference digital level section.

In an embodiment, the corrector 344 corrects the digital level in the infinity position Position_infinity of the lens barrel 100 and the digital level in the proximate position Position_macro of the lens barrel 100 to correspond to a maximum value and a minimum value of the set reference digital level section, and provides the corrected digital levels to the position determiner 343. The position determiner 343 calculates position information of the lens barrel 100, depending on the corrected digital level in the infinity position Position_infinity and the corrected digital level in the proximate position Position_macro, and applies the digital level in the present position to the calculated position information to determine the present position of the lens barrel 100.

Figure 6:
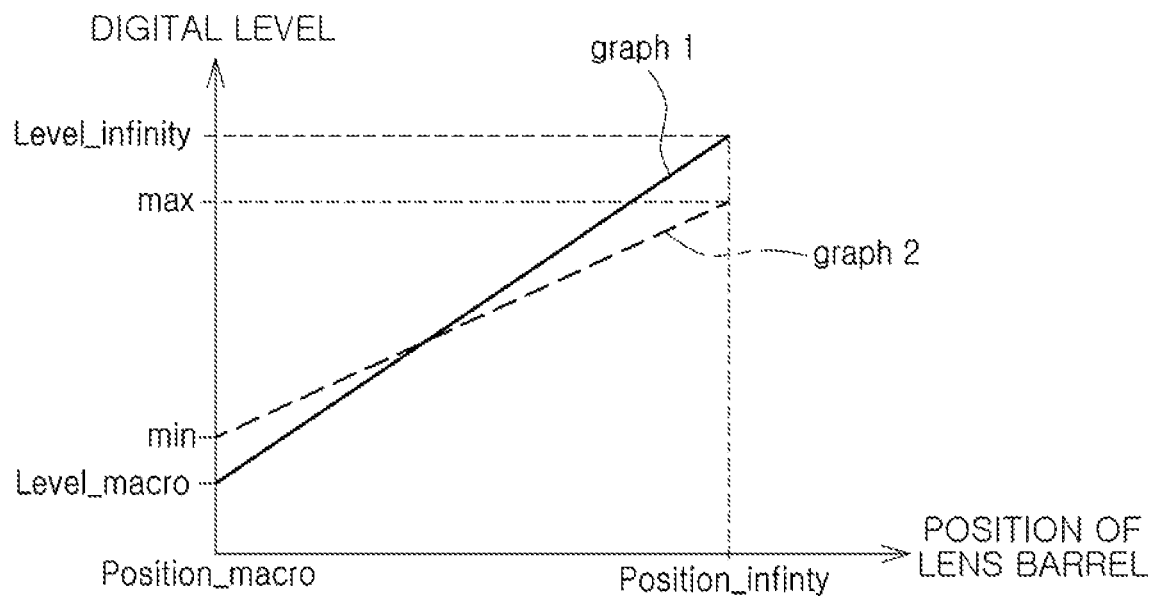
FIG. 6 is a graph illustrating position information corrected by a reference digital level section, according to another embodiment.

FIG. 6 is a graph illustrating position information corrected by a reference digital level section, according to another embodiment. In FIG. 6, a first graph graph1 is the graph illustrated in FIG. 4, and a second graph graph2 is a graph illustrating position information calculated depending on corrections of digital levels in an infinity position and a proximate position.

Referring to FIG. 6, when the digital level Level_infinity in the infinity position Position_infinity and the digital level Level_macro in the proximate position Position_macro are corrected to correspond to the maximum value max and the minimum value min of the reference digital level section, respectively, the first graph graph1 is corrected as illustrated in the second graph graph2. According to another embodiment, the digital level Level_infinity in the infinity position Position_infinity and the digital level Level_macro in the proximate position Position_macro are corrected to correspond to the maximum value max and the minimum value min of the reference digital level section to precisely determine the present position of the lens barrel 100 in the set reference digital level section.

According to another embodiment, the corrector 344 corrects the digital level in the infinity position Position_infinity of the lens barrel 100 and the digital level in the proximate position Position_macro of the lens barrel 100 depending on an external environment. As an example, the corrector 344 corrects the digital level in the infinity position Position_infinity of the lens barrel 100 and the digital level in the proximate position Position_macro of the lens barrel 100 depending on a change in temperature. The corrector 344 includes a temperature sensor to measure a temperature. Alternatively, the corrector 344 may receive temperature information from a host or an external source configured to measure the temperature.

The corrector 344 increases the digital level in the infinity position Position_infinity of the lens barrel 100 and the digital level in the proximate position Position_macro of the lens barrel 100 in response to a change ratio in a temperature when a temperature rises. In addition, the corrector 344 decreases the digital level in the infinity position Position_infinity of the lens barrel 100 and the digital level in the proximate position Position_macro of the lens barrel 100 in response to a change ratio in a temperature when a temperature drops.

The corrector 344 provides the corrected digital levels to the position determiner 343. The position determiner 343 calculates position information of the lens barrel depending on the corrected digital level in the infinity position Position_infinity and the corrected digital level in the proximate position Position_macro, and applies the digital level in the present position to the calculated position information to determine the present position of the lens barrel 100.

Figure 7:
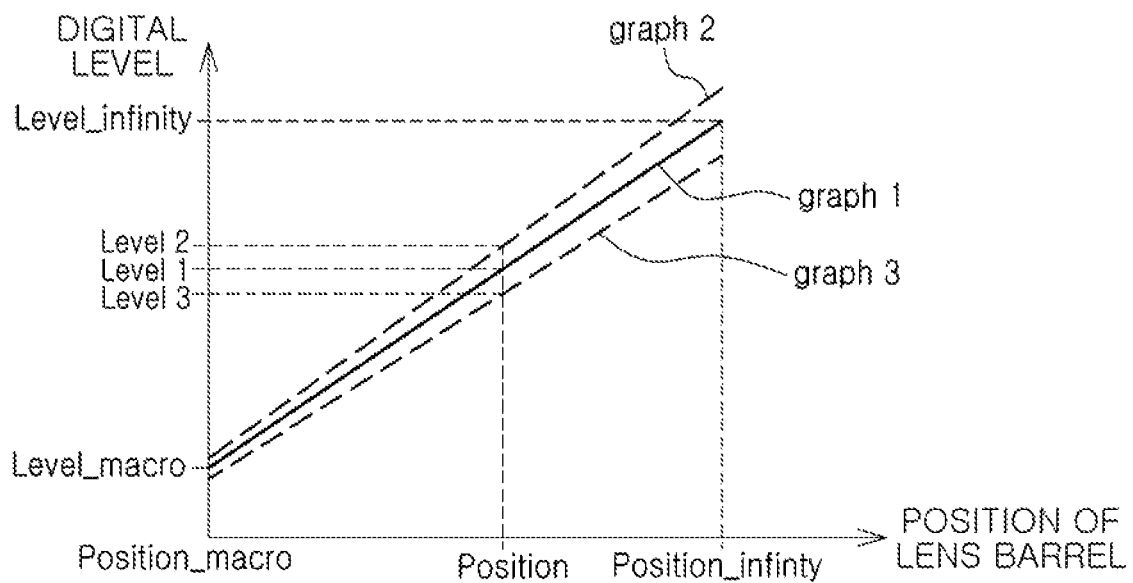
FIG. 7 is graphs illustrating position information corrected by a change in temperature, according to another embodiment.

FIG. 7 is graphs illustrating position information corrected by a change in temperature, according to another embodiment.

In FIG. 7, a first graph graph1 is the graph illustrated in FIG. 4, a second graph graph2 is a graph illustrating position information generated depending on corrections of digital levels in an infinity position and a proximate position when a temperature rises, and a third graph graph3 is a graph illustrating position information generated depending on corrections of digital levels in an infinity position and a proximate position when a temperature falls.

In addition, in FIG. 7, a first digital level Level_1 refers to a digital level in a specific position when a temperature is maintained, a second digital level Level_2 refers to a changed digital level in a specific position when a temperature rises, and a third digital level Level_3 refers to a changed digital level in a specific position when a temperature drops. The first digital level Level_1 changes into the second digital level Level_2 or the third digital level Level_3 based on an increase in a frequency of a clock signal counting an oscillation signal when the temperature rises or a decrease in a frequency of a clock signal counting an oscillation signal when the temperature drops.

According to another embodiment, the corrector 344 determines a correction level of each of the digital level in the infinity position Position_infinity and the digital level in the proximate position Position_macro depending on a change ratio in the temperature. In addition, the corrector 344 determines an increase or decrease direction of correction of each of the digital level in the infinity position Position_infinity and the digital level in the proximate position Position_macro depending on a change direction of the temperature. In an example, the corrector 344 increases the digital level in the infinity position Position_infinity of the lens barrel 100 and the digital level in the proximate position Position_macro of the lens barrel 100 based on the change ratio in the temperature when the temperature rises, and decreases the digital level in the infinity position Position_infinity of the lens barrel 100 and the digital level in the proximate position Position_macro of the lens barrel 100 depending on the change ratio in the temperature when the temperature drops.

Therefore, the position determiner 343 applies the second digital level Level_2 and the third digital level Level_3, respectively, to the second graph graph2 and the third graph graph3 corresponding to the corrected position information to precisely determine that a position that is the same as the first digital level Level_1 is the present position.

As set forth above, the camera module and the actuator thereof, according to the embodiment, precisely detects the position of the magnet from a change in the frequency of the oscillation signal. Further, the actuator of a camera module does not use a separate hall sensor. Consequently a manufacturing cost of the actuator of a camera module is reduced and space efficiency of the actuator of a camera module is improved.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator, comprising:
   a magnet disposed on one surface of a lens barrel;
   a driving coil disposed at a proximity of the magnet;
   a driver configured to apply a driving signal to the driving coil to move the lens barrel along an optical axis; and
   a position detector configured to:
      generate an oscillation signal of which a frequency is changed based on movement of the magnet,
      compare a first oscillation signal generated in a first position of the lens barrel and a second oscillation signal generated in a second position of the lens barrel, and apply a third oscillation signal generated in a present position of the lens barrel to the first oscillation signal and the second oscillation signal to detect the present position of the lens barrel,
      wherein the first position is a maximum travel position of the lens in the object direction, and the second position is a close-up imaging position.

2. The actuator of claim 1, wherein the position detector detects the present position of the lens barrel based on a count value calculated by counting the oscillation signals using reference clocks.

3. The actuator of claim 2, wherein the position detector generates position information based on count values in the first position and the second position of the lens barrel.

4. The actuator of claim 3, wherein the position information is provided in a linear function form based on the first position, a count value in the first position, the second position, and a count value in the second position.

5. The actuator of claim 3, wherein the position detector detects the present position of the lens barrel by applying a count value in the present position to the position information.

6. The actuator of claim 1, wherein the first position corresponds to an infinity position of the lens barrel, and the second position corresponds to a proximate position of the lens barrel.

7. The actuator of claim 1, wherein the position detector includes an inductor configured to generate the oscillation signal and determine the frequency of the oscillation signal.

8. The actuator of claim 7, wherein the inductor is disposed in a range of a magnetic field of the magnet.

9. The actuator of claim 7, wherein a magnetic body is disposed between the oscillation circuit and the magnet.

10. An actuator, comprising:
    a magnet disposed on a surface of a lens barrel;
    a driving coil disposed at a proximity of the magnet;
    a driver configured to apply a driving signal to the driving coil to move the lens barrel in one direction; and
    a position detector configured to generate a digital signal of which a level is changed based on the movement of the lens barrel to detect a present position of the lens barrel,
    wherein the position detector corrects at least one of a digital signal at a first position and a digital signal at a second position of the lens barrel to generate position information and detect the present position of the lens barrel.

11. The actuator of claim 10, wherein the position detector corrects digital levels of the digital signals in the first position and the second position to correspond to a maximum value and a minimum value, respectively, of a reference digital level section.

12. The actuator of claim 10, wherein the position detector corrects digital levels of the digital signals in the first position and the second position based on a change in an external environment.

13. The actuator of claim 12, wherein the change in the external environment comprises a change in temperature.

14. The actuator of claim 13, wherein the position detector determines a correction level of the digital levels of the digital signals in the first position and the second position based on a change ratio in the temperature.

15. The actuator of claim 13, wherein the position detector determines an increase or decrease direction of correction of the digital levels of the digital signals in the first position and the second position based on a change direction of the temperature.

16. The actuator of claim 10, wherein the first position corresponds to an infinity position of the lens barrel, and the second position corresponds to a proximate position of the lens barrel.

17. The actuator of claim 10, wherein the position detector comprises an oscillator configured to generate the digital signal at the first position of the lens barrel corresponding to a long distance imaging position and configured to generate the digital signal at the second position of the lens barrel corresponding to a close-up imaging position.

18. The actuator of claim 10, wherein the position detector comprises a corrector configured to increase a digital level of the digital signal in the first position of the lens barrel and a digital level of the digital signal in the second position of the lens barrel in response to the temperature rising.

19. The actuator of claim 10, wherein the position detector comprises a corrector configured to decrease a digital level of the digital signal in the first position and a digital level of the digital signal in the second position in response to the temperature dropping.

20. The actuator of claim 10, wherein the driving coil is disposed on a surface of a substrate, which further comprises the driver and the position detector, and facing the magnet.

* * * * *